Patented Jan. 26, 1937

2,068,897

UNITED STATES PATENT OFFICE 2,068,897

GAS MIXING VALVE

Harry H. Waters and Robert H. Kerr, Clinton, Iowa, assignors, by mesne assignments, to Reconstruction Finance Corporation, Chicago, Ill., a corporation of the United States Application August 23, 1930, Serial No. 477,440

7 Claims. (Cl. 261—16)

This invention relates to a fuel proportioning device and is disclosed herein as embodied in an apparatus suitable for use in connection with internal combustion engines.

In United States Letters Patent No. 1,954,968, dated April 17, 1934, and issued on an application filed October 5, 1925 in the name of Harry H. Waters, there is disclosed an apparatus for mixing in proper proportions a supply of air and gas, and for subsequently delivering the mixture to the intake manifold of an internal combustion engine. The apparatus disclosed in the said patent also includes an ordinary liquid fuel supply device in communication with the intake manifold and a valve for controlling the passage of liquid fuel therefrom to the manifold. In accordance with the invention disclosed in this patent, air and gas are properly mixed with one another and the explosiveness of the charge may be augmented by supplying it with a quantity of liquid fuel. All that has just been said of the invention disclosed in the aforementioned patent applies to the apparatus which forms the subject matter of the present application, and, for most purposes, it may be considered that the new invention constitutes an improvement over the old; mainly, in the construction and operation of the gas and air mixing device.

In accordance with the present invention the amount of gas admitted to the intake manifold varies in a pre-determined manner in respect to variations occurring in the load carried by the engine, and similarly, the amount of air admitted to the gas bears a pre-determined relation to the amount of gas admitted. In another aspect an important object resides in the provision of a novel apparatus for controlling the admission to the intake manifold of one or more mediums calculated to assist the combustion. The mediums so supplied may be gas and air, a lubricant, air and an anti-detonating fluid, etc. From this standpoint the merit of the invention resides in features of construction of the mechanical parts of the apparatus which are applicable not only to the proportioning of air and gas but likewise to other mediums such as those named.

Figure 1:
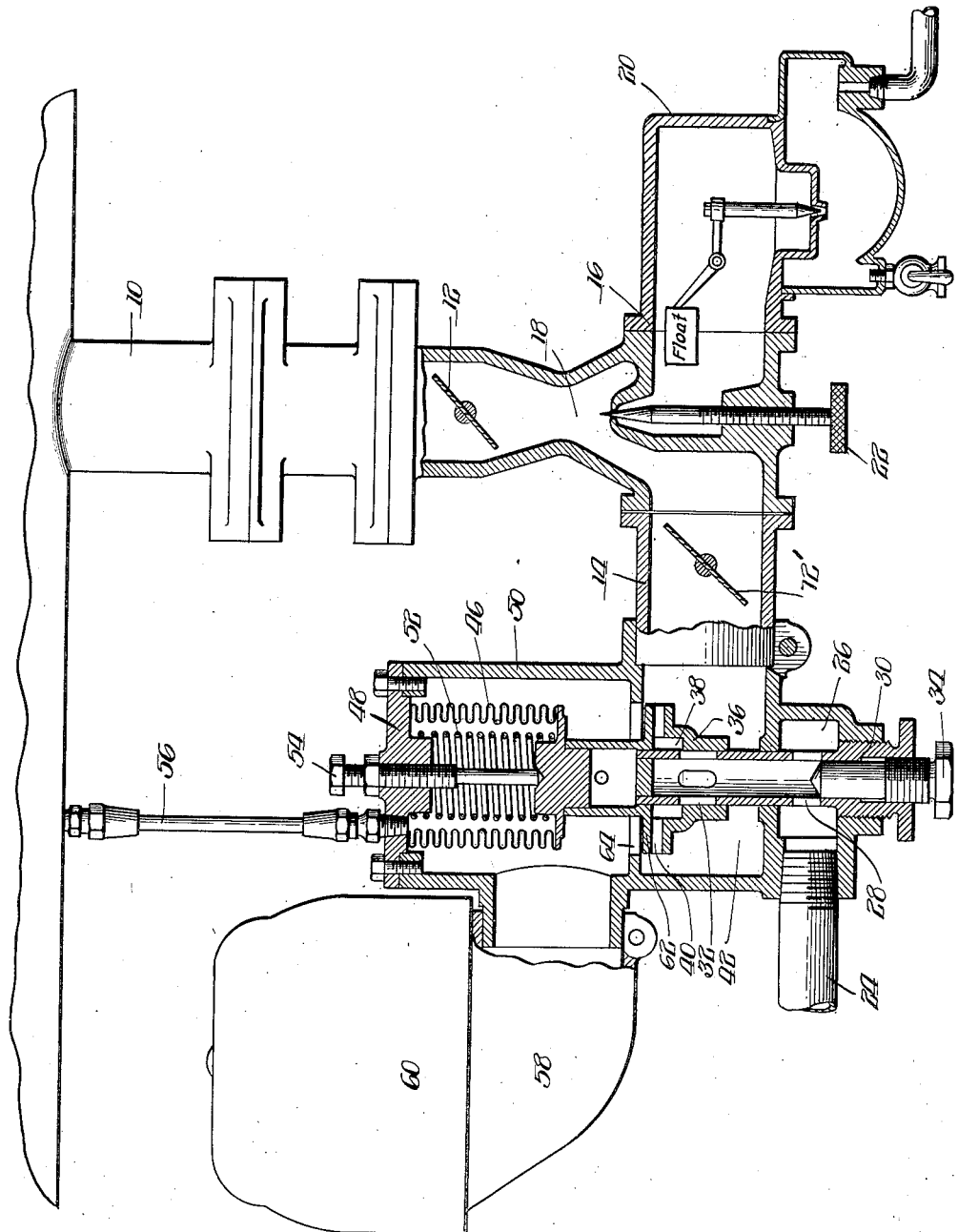
Figure 2:
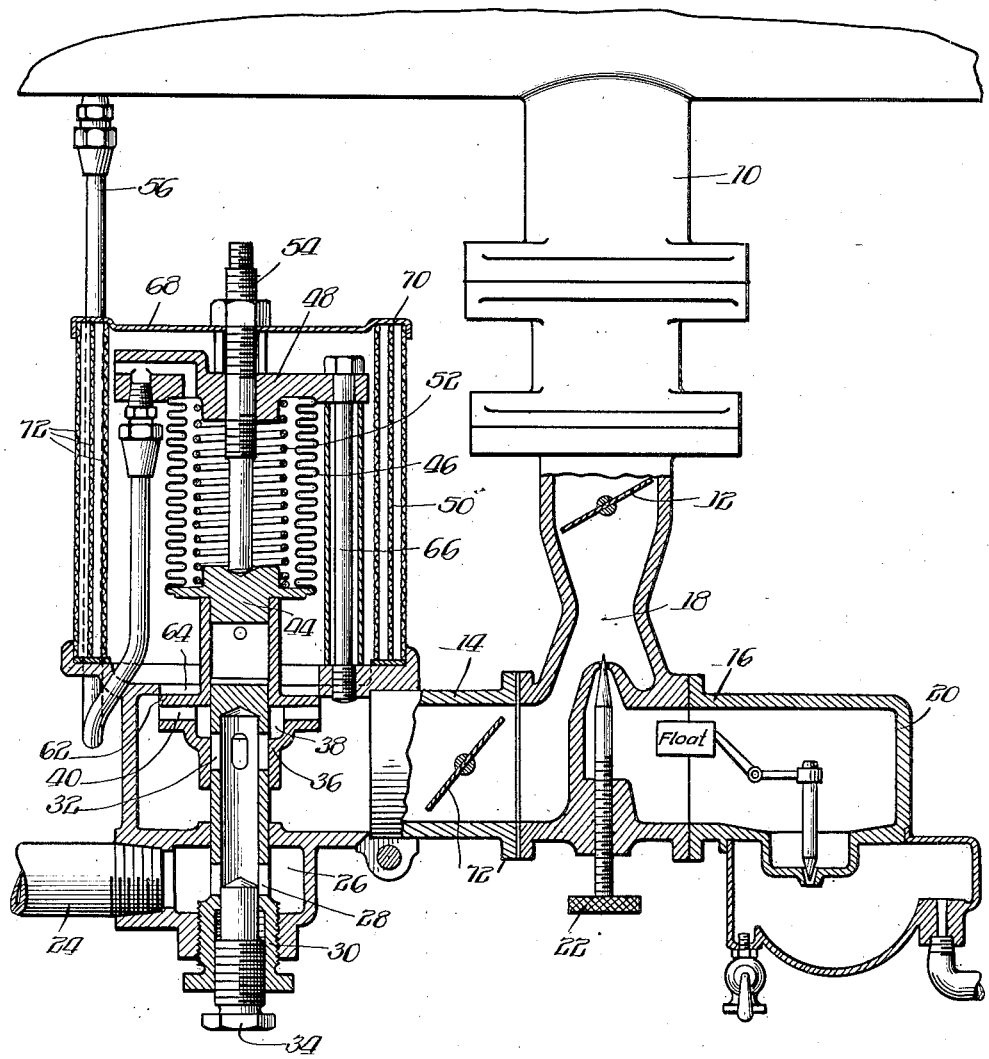

Other objects and features of the invention will become apparent from a reading of the following description in the light of the accompanying drawings, in which Figure 1 is a view with certain parts broken away, of an apparatus embodying the invention, and Figure 2 is a view similar to Figure 1 of a somewhat modified form of apparatus.

As shown in Figure 1 of the drawings, the reference numeral 10 indicates the intake manifold of an internal combustion engine. A throttle valve 12 is provided for controlling the passage of fuel through the intake manifold in accordance with present day practices that are too well known to require further explanation. A plurality of conduits 14 and 16 are connected with the intake manifold adjacent to the throat 18 thereof, and one of the passageways is in communication with a device for supplying an admixture of gas and air whereas the other leads to a liquid fuel supply device 20 of any desired construction. A valve 22 is provided for controlling the amount of liquid fuel delivered from the device 20 to the throat 18 of the intake manifold 10. No air is introduced into the throat 18 from the valve 22. The device 20 supplies only liquid fuel.

Turning now to the device for proportionately mixing air and gas prior to its delivery to the conduit 14, the reference numeral 24 indicates a gas jet which communicates with an annular chamber 26. Openings 28 connect the annular chamber 26 with the interior of a hollow sleeve 30 which is provided with openings 32 in its upper portion. The amount of gas permitted to flow through the openings 28 may be controlled by means of a screw threaded plug 34 located in the bottom of the sleeve 30. The emission of gas from the openings 32 is controlled by a sleeve 36 which slides over the inner sleeve 30 and, according to its position with respect thereto, uncovers more or less of the openings 32 to permit the escape of a correspondingly greater or lesser amount of gas into an annular chamber 38 and from thence through port openings 40.

In operation the sleeve valve 36 moves upwardly or downwardly in accordance with variations in load conditions of the engine and, depending upon such movement, a pre-determined amount of gas flows through the openings 32 into the annular chamber 38, and from there through the ports 40 into a mixing chamber 42, which is located immediately to the left of the conduit 14 as shown in Figure 1. It has already been pointed out that the adjustment and movement of the sleeve valve 36 is in accordance with variable factors of the engine and the means for accomplishing this end will now be described. The upper extremity of the sleeve valve 36 is secured to the bottom 44 of a corrugated bellows type diaphragm 46, which is secured at its upper extremity to the cover 48 of an enclosed metallic chamber 50. In order that the diaphragm 46 will normally occupy an extended position there is provided a compression spring 52 mounted interiorly of the diaphragm, and to the end of limiting the collapsible extent of the diaphragm, an adjustable stop screw 54 is located within the top 48.

Movement of the diaphragm, (which is shown fully contracted) that is, expansion or contraction, is controlled by pressure variations occurring in the intake manifold above the throttle valve 12, such variations being communicated to the interior of the diaphragm through a pipe 56. Thus during the course of operation of the device, if the throttle valve is closed and the engine is running idly, a high suction fills up within the diaphragm 46 tending to collapse the same and close the valve 36, cutting off the admission of gas to the conduit 14. Inversely, as the load and speed of the engine are increased and the throttle valve is opened, the suction is decreased, allowing the compression spring 52 to come into action to open the valve 36 and permit the admission of a greater amount of gas to the engine.

It is desirable, of course, to mix a suitable amount of air with the incoming gas and to vary the amount of air so admitted in accordance with variations occurring in the amount of gas admitted. To this end there is provided an air cleaner comprising an intake 58 and an air cleaning screen 60. Furthermore, the sleeve valve 36 is double acting and as shown is provided with a disc like portion 62 for controlling the size of an opening 64 which leads from the chamber 50 to the mixing chamber 42. It is apparent that in operation air will flow through the opening 64 into the mixing chamber 42 and that the size of the opening through which the air thus flows will vary in accordance with movement of the valve 36 and the extent of such variation will be in direct proportion to variations occurring in the size of the openings 32 from which the gas is expelled.

In Figure 2 similar reference numerals have been used to indicate corresponding parts and it will be observed that with the exception of the air cleaner arrangement, the parts of the two assemblages are very similar. The intake manifold, the communicating conduits, the carburetor, the gas and air admission valves, the diaphragm and all such parts are identical and the difference between the two arrangements resides in the incorporation in Figure 2 of the air intake and screen into the casing surrounding the diaphragm. In the modification shown in Figure 1 the air intake 58 and the cleaner 60 are mounted outside of the metal chamber 50 whereas in the modification shown in Figure 2 the metal chamber 50 has been dispensed with and in its place are provided a plurality of supporting posts 66 for carrying the top 48 of the diaphragm chamber. Located above the top 48 is a thin metallic lid 68, which extends outwardly and has an annular cup shaped portion 70 for receiving the upper extremity of one or a plurality of cleaning screens 72. To facilitate the removal of the screens for replacement or cleaning purposes, the pipe 56 for communicating the interior of the diaphragm 46 with the intake manifold 10 is extended downwardly and thence upwardly within the cleaning screens. By means of this arrangement the lid 68 may be removed without striking any obstruction and the cleaning screens likewise may be completely removed merely by lifting them up and out of engagement with the parts they surround.

As shown, the intake passageway 14 may be provided with a valve 72' for controlling independently of the throttle valve 12 and the valve 36, the admission of the mixture to the intake manifold.

It is to be appreciated that many modifications and changes may be made in the construction and arrangement of the parts without departing from the scope of the invention and that the operation of the fuel mixing parts may be made to depend upon variations in the speed of the engine as well as the load. Furthermore it is easily conceivable and within the contemplation of the invention that the mixing device may be employed for the purpose of mixing fuels or fluids other than gas and air as for example air and lubricants, air and an anti-detonating fluid, etc.

Having thus described our invention, what we claim is new and desire to prove by United States Letters Patent, is:

1. An apparatus of the character described, having, in combination, an intake manifold, a plurality of conduits in communication with the intake manifold, a liquid fuel supply device in communication with one of the conduits, and a fluid control device connected with the other conduit, said device comprising a plurality of fluid conducting passageways, a double acting valve for controlling the flow of fluid through said passageways, a flexible member having communication with the intake manifold for controlling the operation of said valve, and a screen surrounding the control means, said screen being adapted to clean one of the fluids prior to its admission to the fluid conducting passageways.

2. An apparatus of the character described having, in combination, an intake manifold, a plurality of conduits in communication with the intake manifold, a liquid fuel supply device in communication with one of the conduits and a fluid control device connected with the other conduit, said device comprising a plurality of fluid conducting passageways, a multiple valve for controlling the flow of fluid through the passageways, a flexible diaphragm for controlling the movement of the valve, a conduit for communicating the interior of the diaphragm with the intake manifold, and a cleaning screen surrounding the diaphragm for acting upon one of the fluids prior to its admission to the fluid conducting passageways.

3. An internal combustion engine having, in combination, an intake manifold, a plurality of conducting passageways opening into the intake manifold, a valve mechanism for controlling the size of the openings between the intake manifold and said plurality of conducting passageways, a flexible diaphragm adapted to control movement of the valve mechanism, a casing surrounding the diaphragm, said casing having side walls constructed and arranged to permit the admission of air therethrough, and means connecting the diaphragm with the intake manifold.

4. A carburetion apparatus for internal combustion engines comprising a fluid fuel control device having oppositely disposed independent fluid conducting passageways, one of said passageways being a fuel gas passageway and the other being an air passageway, a double-acting valve for controlling the flow of fluid through the passageways, an intake manifold, means for controlling the movement of said valve in accordance with variations occurring in the pressure in the intake manifold, a conduit communicating the control device with the intake manifold, a liquid fuel reservoir, a liquid conduit communicating with said reservoir and terminating in a discharge orifice in said first named conduit, valve means for controlling the flow of liquid through said orifice, and independently operable valve means in said first named conduit on each side of said liquid discharge orifice.

5. A carburetion apparatus for internal combustion engines comprising an air conduit, a fuel gas conduit terminating in a sleeve member having a closed end, said sleeve member being disposed centrally within said air conduit, openings in said sleeve, a valve having a sleeve portion encircling said first mentioned sleeve and the openings therein and a disk portion in said air conduit for controlling air flow therethrough, an intake manifold, means for controlling the movement of the valve in accordance with pressure variations within the intake manifold, and conduit means for transmitting air and gas mixture from the valve to the intake manifold.

6. An apparatus of the character described comprising a fluid control device having oppositely disposed fluid conducting passageways, a double-acting valve for controlling the flow of fluid through said passageways, variable means for controlling in a predetermined manner the actuation of said valve, an intake manifold, a conduit communicating the fluid control device with the intake manifold, a liquid reservoir, and a liquid conduit communicating with said liquid reservoir and terminating in a discharge orifice within said first named conduit.

7. An apparatus of the character described comprising a fluid control device having oppositely disposed independent fluid conducting passageways, a double-acting valve for controlling the flow of fluid through the passageways, an intake manifold, means for controlling the movement of said valve in accordance with variations occurring in the pressure in the intake manifold, a conduit communicating the fluid control device with the intake manifold, a liquid fuel reservoir, and a liquid fuel conduit communicating with said reservoir and terminating in a discharge orifice in said first named conduit.

HARRY H. WATERS.
ROBT. H. KERR.